United States Patent [19]
Portinari et al.

[11] 3,801,729
[45] Apr. 2, 1974

[54] ARMORED SUBMARINE ELECTRIC POWER CABLE WITH A PLURALITY OF GROUNDING DEVICES FOR A LAYER THEREOF

[75] Inventors: Giovanni Portinari; Sesto San Giovanni; Antonio Brovedan, all of Milan, Italy

[73] Assignee: Industrie Pirelli Societa per Azioni, Milan, Italy

[22] Filed: July 13, 1973

[21] Appl. No.: 378,972

[30] Foreign Application Priority Data
July 27, 1972 Italy .................................. 27475/72

[52] U.S. Cl. .................. 174/106 R, 29/624, 174/78
[51] Int. Cl. ...... H01b 7/14, H01b 9/02, H01b 13/22
[58] Field of Search ......... 174/10, 68 R, 70 R, 70 S, 174/78, 106 R, 108, 115; 29/624, 628

Primary Examiner—Laramie E. Askin
Attorney, Agent, or Firm—Brooks Haidt & Haffner

[57] ABSTRACT

Devices for conductively interconnecting the frettage and the armor of a submarine electric power cable and a power cable including such devices, the devices including a C-shaped clamping element mounted on the frettage and covered by an insulating sheath except for a small hole over a threaded hole in the clamping element and including a threaded element extending through the sheath hole and into the threaded hole of the clamping element. The threaded element may have arms or spokes to assist in screwing it into place and the threaded element is covered by and in contact with the surrounding armor. The clamping elements are applied to the frettage prior to the extrusion of the insulating sheath thereover, holes are successively punched into the sheath over the threaded hole in the clamping element, the threaded elements are successively inserted and the armor is then applied.

5 Claims, 5 Drawing Figures

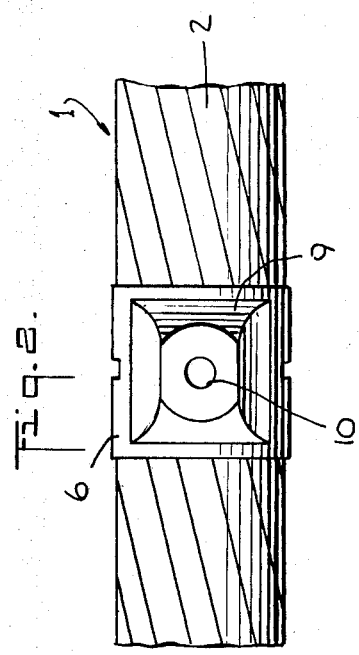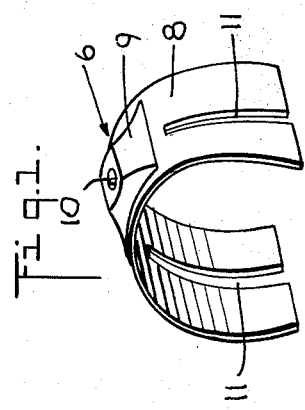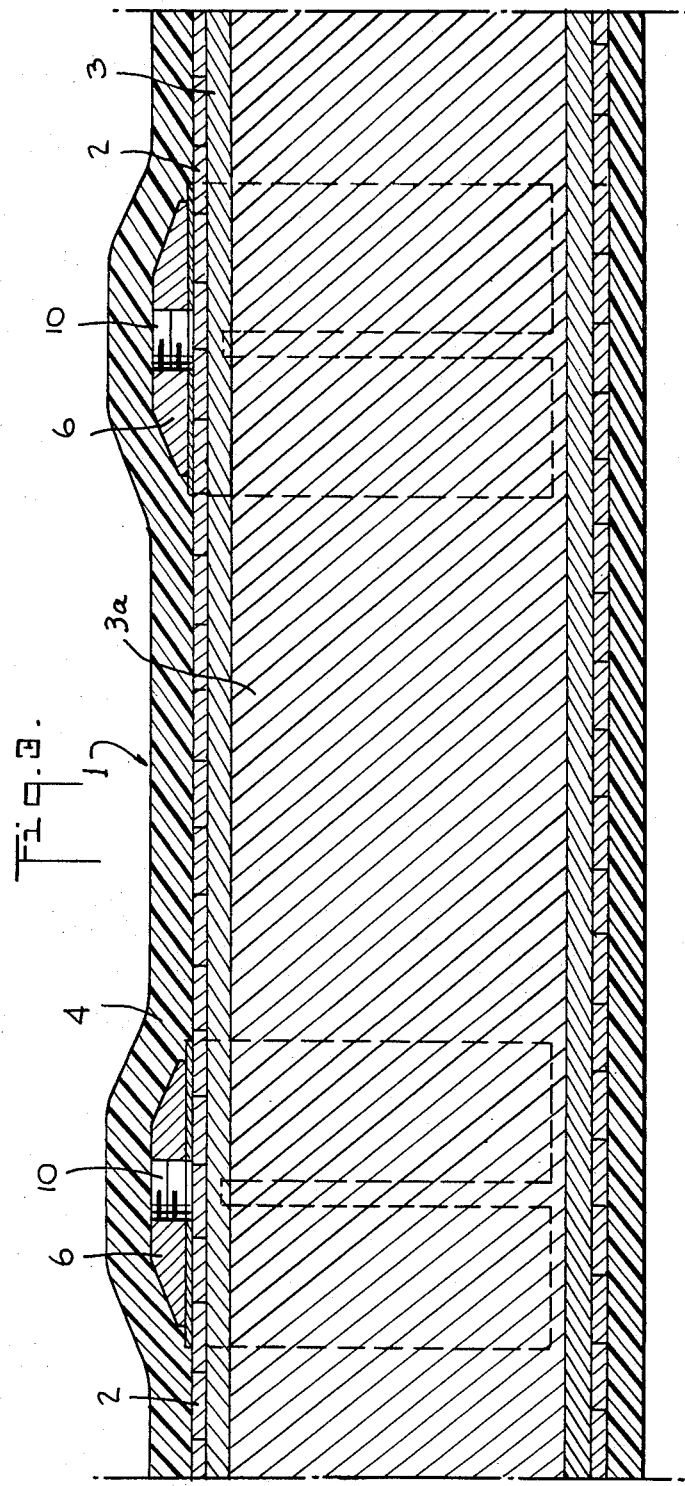

ARMORED SUBMARINE ELECTRIC POWER CABLE WITH A PLURALITY OF GROUNDING DEVICES FOR A LAYER THEREOF

The present invention relates to methods and devices for electrically grounding a conductive layer of a submarine electric power cable and particularly to the application of such devices between two metallic parts, known as the frettage and armor. Specifically, the invention relates to a process and to devices which permit the application of said devices during the manufacture of the submarine cable, without, in any event, requiring removal of the material provided around the cable before the application of the devices.

It is known that, in cables of the above-mentioned type, the frettage and armor are not in mutual contact because, to prevent the penetration of sea water and the consequent corrosion of the frettage, an extruded insulating sheath, made for instance of polyethylene, is applied on the latter.

It is also known that in a submarine power cable, which is subjected to interrupted and reapplied voltages, overvoltages of high value are originated, which propagate as travelling waves along the cable itself, with a consequent circulation of current in the metallic parts. Because of the different variations of voltage on the metallic parts, due to said currents, a difference of potential arises between the frettage and the armor, which may be so high as to exceed the break-down voltage of the dielectric material of the sheath. Said problems of an electrical nature have been overcome by providing, along the cable, short circuiting electrical connections between the frettage and the armor, by means of the above-mentioned grounding devices.

Since said devices are mounted on the frettage and must come into contact with the armor, they interrupt the continuity of the insulating sheath, and therefore, it will be understood that they must be applied so as to create short circuit connections between the two metallic parts of the cable without affecting or weakening the protecting function exerted by the insulating sheath extruded on the frettage. For this reason, the devices used comprise means able to ensure both a secure anchorage on the frettage and a hydraulic seal at the points where the devices pass through the insulating sheath.

The conventional devices already known comprise a single conductive element having a surface able to provide a good contact with the frettage and having a prolongation of sufficient height to extend through the thickness of the insulating sheath and thereby come into contact with the armor.

The application of a grounding device comprising a single element necessarily requires the extrusion of the insulating sheath on the frettage and the subsequent removal of portions of the sheath for the insertion of the single conductive element.

One object of the invention is to provide a method for applying a grounding device without removing and subsequently rebuilding the insulating sheath extruded on the frettage at the places where the grounding devices are positioned.

The main object of the present invention is to provide a method for applying grounding devices in a submarine electric power cable of the type comprising a frettage and an armor separated by an insulating sheath. Each of said devices comprises a first conductive element and a second conductive element able to receive the first, and during the cable manufacture, after the phase of applying the frettage and before the subsequent extrusion of the insulating sheath, said second conductive elements are applied on the frettage layer, where they are covered subsequently and progressively, in the extrusion phase, by the insulating sheath. After the phase of extruding the insulating sheath, and during the phase of constructing the armor, the first conductive elements are inserted in the second conductive elements after the sheath has been perforated.

A further object of the present invention is to provide a grounding device for carrying out the hereinbefore described method, said device having a first element constituted by a threaded member and a second element constituted by a metallic covering, the surface of the covering in contact with the frettage following the cable curvature, a plate provided with a threaded hole for receiving said threaded member being welded on top of said covering.

The objects and advantages of the present invention will be better understood from the following description of the preferred embodiment thereof, which description should be considered in conjunction with the accompanying drawings, in which:

FIG. 1 is a perspective view of a part of the preferred embodiment of the grounding device of the invention;

FIG. 2 is a top view of a cable before a sheath has been extruded thereon;

FIG. 3 is a longitudinal section of the cable after the sheath has been extruded thereon;

Figure 4:
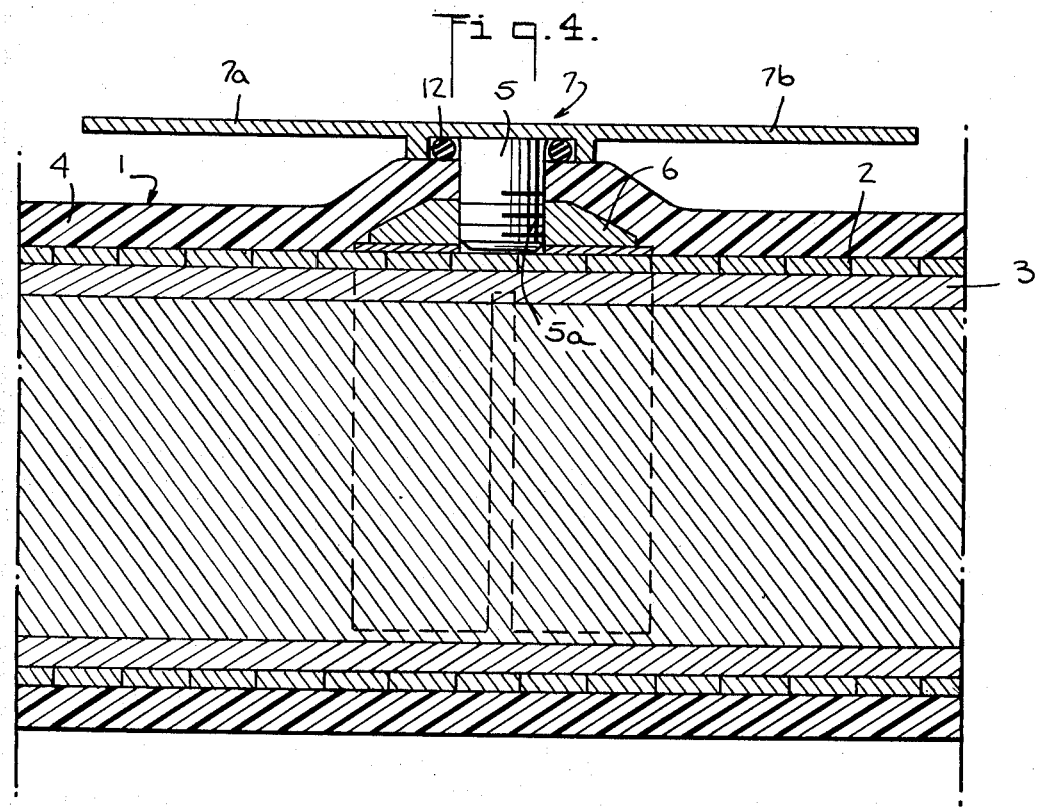
FIG. 4 is a longitudinal section of the cable after the application of the grounding device.

The method of the present invention is illustrated in successive phases in FIGS. 2 and 3 which illustrate a partially manufactured submarine power cable 1 of the type comprising a frettage 2 constituted, in a conventional manner, by metallic tapes helically wound up about a lead sheath 3 around a conventional power cable core 3a usually comprising a conductor surrounded by layers of insulation (FIG. 3). FIG. 3 represents the cable after it has been provided with an extruded insulating sheath 4 and as it appears when it leaves the extruder. In FIG. 2, the grounding device is shown partially applied.

The method of the present invention makes use of a device comprising a first conductive element 5 (FIGS. 4 and 5) and a second conductive element 6 (FIGS. 1-5) able to receive the first element 5. The first conductive element 5 has a threaded portion 5a and a turning head 7 with a pair of metal spokes 7a and 7b extending therefrom, and the second conductive element 6 is constituted by a covering or clip 8 (FIG. 1) to which is welded a plate 9 provided with a central threaded hole 10 to receive the threaded portion 5a of the first element 5. Although only two spokes 7a and 7b are shown, a greater number may be used.

The inner surface of the covering 8, as viewed in FIG. 1, is so shaped that it follows as closely as possible the configuration which the cable will take after the formation of the frettage 2. In this way, the assembling of the second elements of the grounding devices, which are progressively applied by clamping them to the frettage 2 during the passage of the cable towards the extruder, is facilitated.

In order to improve the elasticity of the covering 8 and to permit, therefore, good clamping thereof to the frettage 2, said covering 8 is interrupted along two zones 11 by slots.

In a preferred embodiment of the invention, the material used for the covering 8 is beryllium-copper, which is both a good conductor and an elastic material.

It is clear that the drawings represent in a diagrammatical and simple manner the form of the grounding device, but it will be understood that other solutions could be provided. However, in all the adopted solutions the device is not constituted by a single conductive element, but comprises two separate conductive elements, so as to make possible the application of the two elements in successive steps and the avoidance of the removal of the insulating sheath to apply the device which contacts the frettage 2.

In the manufacturing phase subsequent to the application of the frettage 2, and without stopping the cable during its travel towards the extruder, the second elements 6 of the grounding devices are secured to the frettage 2 by clamping them thereon as shown in FIG. 2. Their positions do not suffer any modification during extrusion of the sheath 4, since the inner surface of the second element 6 conforms to the outer surface of the frettage 2, and moreover, since, on account of the elasticity of the covering 8, there is always a good adherence of the latter on the frettage 2, such as will ensure a good electrical contact. As the cable passes through the extruder, the second elements 6 of the grounding devices are further locked in a position which remains fixed because of the gripping action of the insulating sheath 4 extruded around the elements 6 as the sheath 4 cools.

Due to the presence of the second elements 6 of the grounding devices below the insulating sheath 4, the cable coming out from the extruder shows visible undulations at the upper part of the sheath 4 (see FIGS. 3 and 4). This permits the positions for subsequent application of the first elements 5, as explained hereinafter, to be observed readily.

After the application of the sheath 4 the next processing steps are carried out, which comprise both the application of the armor and the perforation of the sheath 4 in order to allow the insertion of the first element 5 in the second element 6.

The perforation of the sheath 4 is carried out with tools in common use, for example, appropriate calibrated hollow punches, by means of which, at the undulations in the sheath 4, the hole 10 of the second elements 6 is uncovered by removing a disc of the sheath 4 which covers such hole 10. Subsequently, the element 5 is inserted in the hole 10 by exerting a manual screwing action on its head 7. A sealing ring 12, e.g., an elastomeric O-ring, is placed between the head of the element 5 and the sheath 4.

Figure 5:
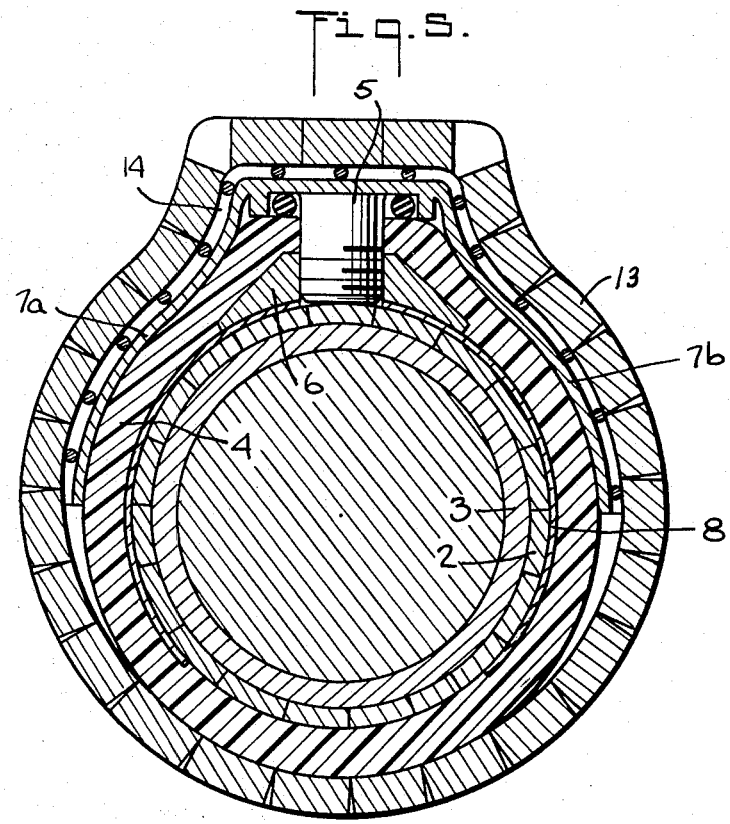
FIG. 5 is a cross-section of the cable provided with the grounding device and armor.

Once the element 5 is seated, the spokes 7a and 7b are deformed so as to bring them into close contact with the surface of the sheath 4 as indicated in FIG. 5. Said spokes 7a and 7b have the task of extending the area of contact with the armor 13, which is superimposed on the first element 5, and which is illustrated diagrammatically. The area of contact with the armor 13 may be increased by the interposition of a suitable flexible metallic element, for example, a braid of metal wires 14, in order to improve the electrical contact with the armor 13.

The operations of perforating and inserting the first element 5 in the second element 6 are progressively repeated along the insulating sheath 4. In this way, it is possible to provide along the cable a series of short circuiting connections between the frettage 2 and the armor 13.

The main advantage of the method of the invention is that the time necessary for the application of the grounding devices between the frettage 2 and the armor 13 is considerably reduced, it being unnecessary to resort to prolonged pauses for installation thereof or to the rebuilding of the insulating sheath 4 after they are applied.

Although a preferred embodiment of the present invention has been described and illustrated, it will be understood by those skilled in the art that various modifications may be made without departing from the principles of the invention.

What is claimed is:

1. In a process for manufacturing a submarine electric power cable comprising a conductive frettage, an insulating sheath around said frettage, a conductive armoring layer around said sheath and means conductively interconnecting said armor and said frettage at spaced positions along the length of said cable in which process after said frettage is formed, said sheath is extruded over said frettage and said armoring layer is applied to said sheath, the steps of applying conductive elements to said frettage at spaced positions thereon after the formation of said frettage and prior to the extrusion of said sheath thereover, whereby said conductive elements become covered by said sheath, and as said armoring layer is applied over said sheath, inserting further conductive elements through said sheath and into contact with said first-mentioned conductive elements while maintaining portions of said further elements exposed to said armoring layer for contact therewith.

2. In a process as set forth in claim 1, the further step of perforating said sheath at positions corresponding to said first-mentioned conductive elements prior to the insertion of said further conductive elements.

3. A submarine electric power cable comprising a core, a conductive frettage around said core, an insulating sheath around said frettage, a conductive armoring layer around said sheath and a plurality of means spaced lengthwise of said cable and conductively interconnecting said frettage and said armoring layer, each of said means comprising a clamping element between said frettage and said sheath and having an inner surface conforming to and gripping the exterior surface of said frettage and an outwardly facing threaded hole and a threaded element extending from externally of said sheath and in engagement with said armoring layer to and into said threaded hole in said clamping element.

4. A cable as set forth in claim 3, wherein said clamping element is made of beryllium-copper and resiliently grips said frettage.

5. A cable as set forth in claim 3, wherein said clamping element is C-shaped in cross-section and has a plate secured to the outer surface thereof, said threaded hole being in said plate, and wherein said threaded element is a headed screw which has its head outwardly of said sheath and has its threaded portion in engagement with the threads in the wall of said hole.

* * * * *